Feb. 20, 1940.  G. M. CAMPBELL  2,190,976
PANEL REGULATING APPARATUS
Filed Aug. 9, 1937  2 Sheets-Sheet 1
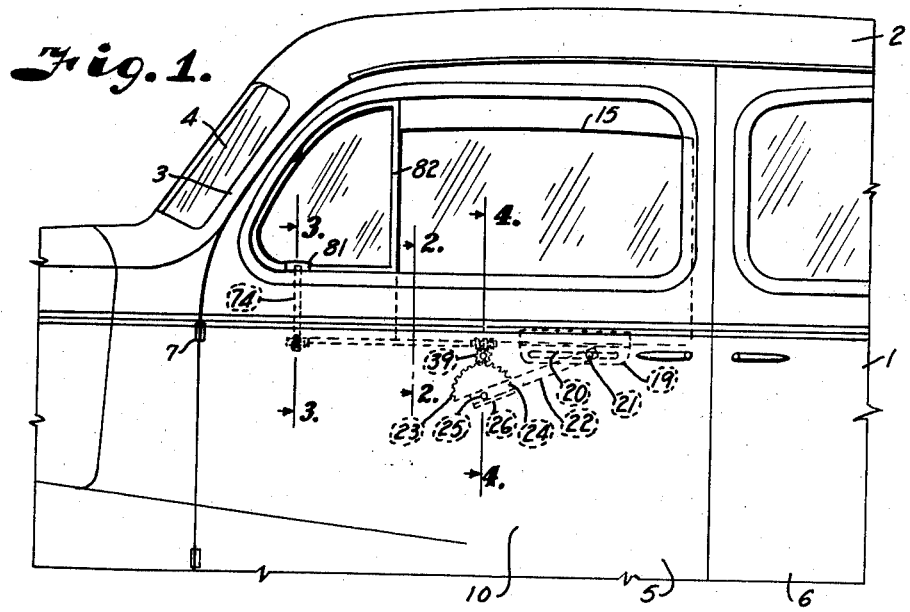
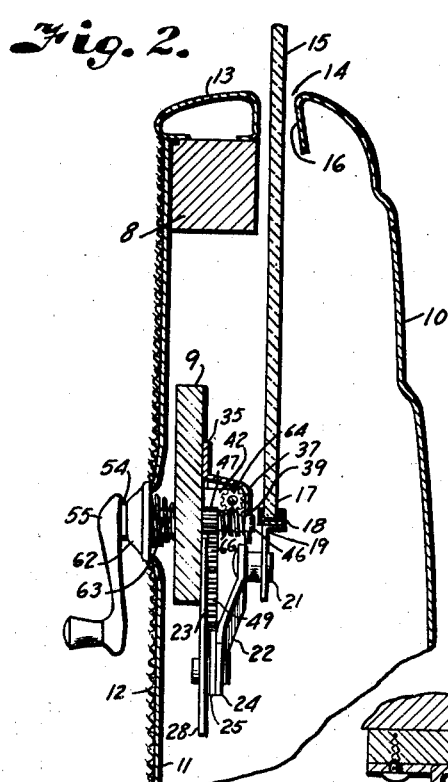
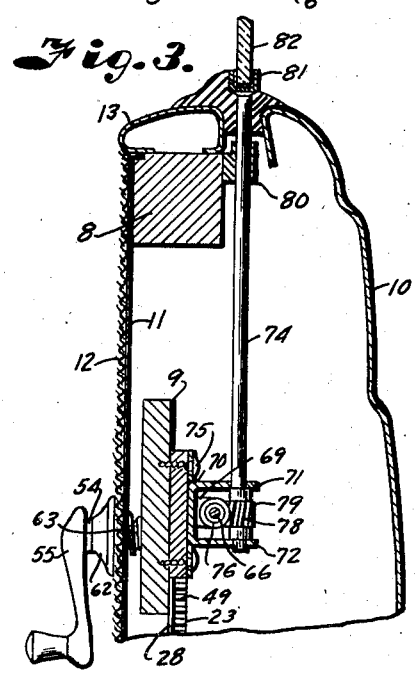
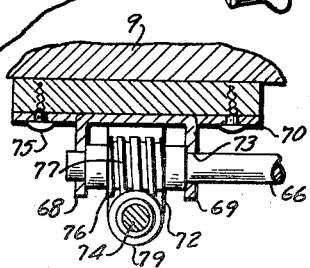
INVENTOR
George M. Campbell
BY
ATTORNEY Feb. 20, 1940. G. M. CAMPBELL 2,190,976
PANEL REGULATING APPARATUS
Filed Aug. 9, 1937 2 Sheets-Sheet 2
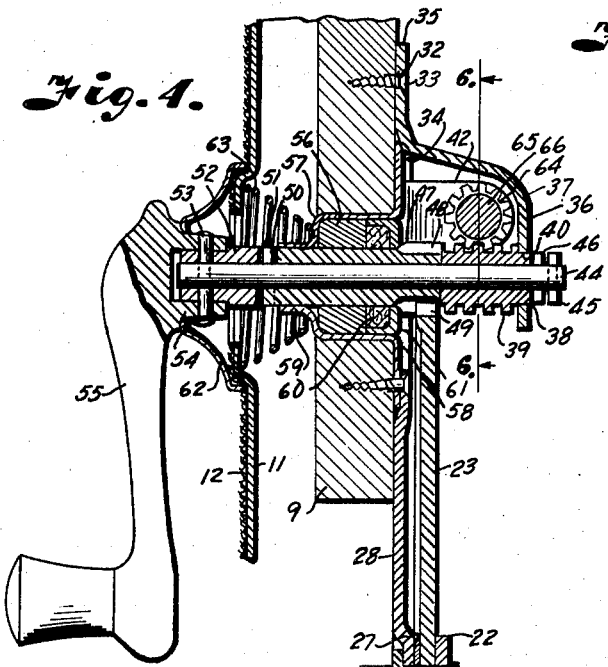
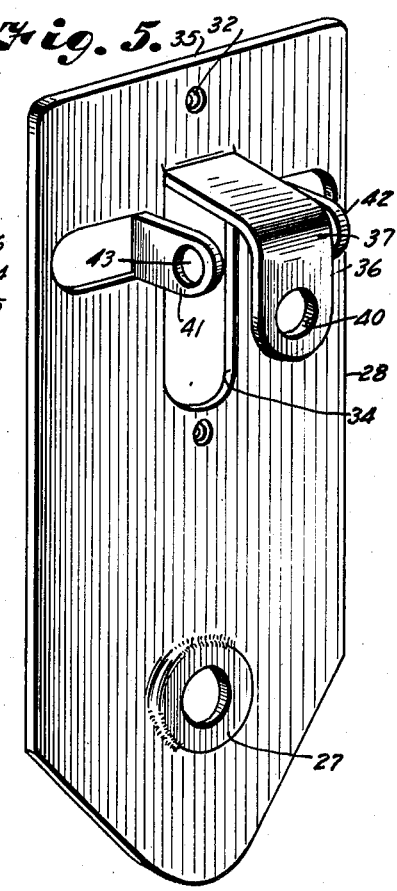
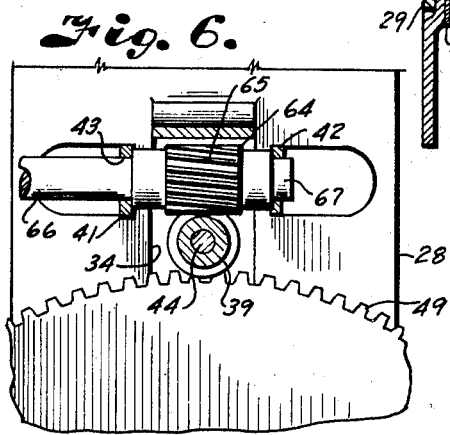
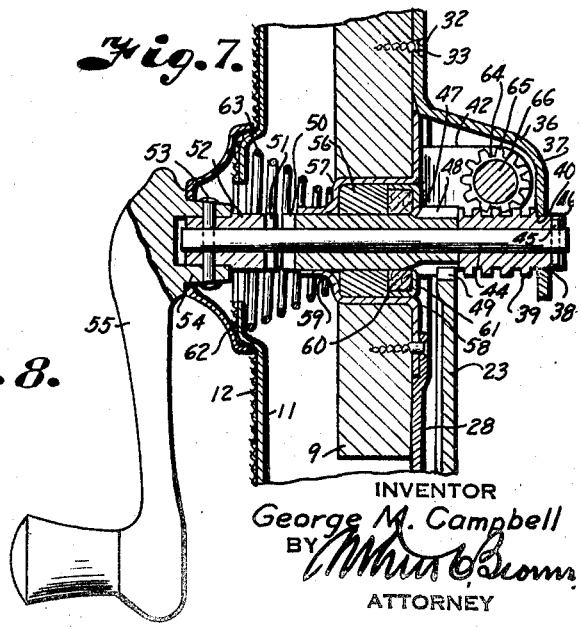
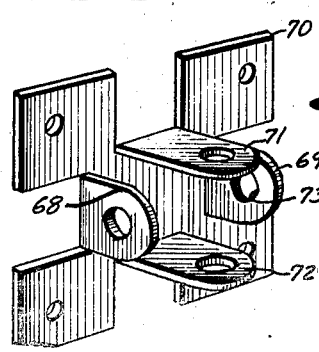
INVENTOR
George M. Campbell
BY
ATTORNEY Patented Feb. 20, 1940

2,190,976

UNITED STATES PATENT OFFICE 2,190,976

PANEL REGULATING APPARATUS

George M. Campbell, Kansas City, Mo.

Application August 9, 1937, Serial No. 158,135

6 Claims. (Cl. 296—44)

This invention relates to panel regulating apparatuses and more particularly to an apparatus for regulating the relative positions of the swinging and sliding window panels of automotive vehicles.

It is well known that the proper ventilation of a motor vehicle by means of regulating the positions of the windows of such vehicle is sometimes difficult, tedious and even dangerous, particularly when the regulation is attempted by the operator of the vehicle and while the vehicle is in operation. It is also customary in present day designs of window ventilation to provide a sliding window and a laterally adjustable window, each of which requires a separate operation for adjustment.

It is the principal object of the present invention to provide a window panel regulating apparatus which is capable of adjusting the window panels of automotive vehicles of the type above mentioned simultaneously or individually depending upon the demands of the ventilation requirements encountered.

Other important objects of the present invention are to provide a regulating apparatus which can be readily operated from the interior of the vehicle while the vehicle is moving; to provide for eliminating excessive protuberances extending within the vehicle and thereby enhancing the comfort and safety of the occupants of the vehicle; to provide a regulating apparatus which is facilely and efficiently operated; and to provide an apparatus of this character which is easily installed in automotive vehicles.

In accomplishing these and other objects of the present invention, I have provided improved details of structure, the preferred form of which is illustrated in the accompanying drawings, wherein:

Fig. 1 is an elevational view of an automotive vehicle illustrating, in dotted lines, the application of a panel regulating apparatus embodying the features of the present invention to the door and window opening of a vehicle.

Fig. 2 is a vertical section through a portion of the door of the vehicle on the line 2—2, Fig. 1, illustrating the sliding panel regulator.

Fig. 3 is a vertical section through the swinging panel regulating apparatus on the line 3—3, Fig. 1.

Fig. 4 is a vertical central section through the swinging panel regulating apparatus on the line 4—4, Fig. 1, particularly illustrating the construction and arrangement of parts thereof and showing the apparatus in sliding panel regulating position.

Fig. 5 is a detail perspective view of one of the supporting plates for the panel regulating apparatus.

Fig. 6 is a vertical section on the line 6—6, Fig. 4, partly in section illustrating the relation of the sliding panel gear segment, the driving worm and swinging panel shaft worm gear.

Fig. 7 is a vertical section somewhat similar to Fig. 4 showing the apparatus in swinging panel regulating position.

Fig. 8 is a detail perspective view of the supporting bracket for the swinging panel and shaft therefor.

Fig. 9 is a detail plan view partly in section of the swinging panel shaft and driving means therefor.

Referring more in detail to the drawings:

1 designates one side of a motor vehicle body which, as in conventional practice, is provided with a top 2, and a side post 3 for aiding in supporting a windshield 4. Door structures 5 and 6 are hinged to the body as at 7 in the usual manner so that passengers of the vehicle can enter and leave.

The front door 5 includes the usual frame structure consisting of substantially horizontal supporting members 8 and 9, an outer metal panel 10, an inner panel 11 covered by the usual fabric 12 and an upper finishing molding 13 supported on the member 8. The panels 10 and 11 are spaced to provide an opening 14 in which the sliding panel 15 is vertically adjustable, the panel 15 being movable vertically between the adjacent side faces of the upper portion 16 of the panel 10 and the molding 13 as shown in Fig. 2.

The bottom edge 17 of the sliding panel is fixed to a bracket member 18 from which depends a regulating flange 19 provided with a longitudinally extending slot 20 for receiving a pin 21 carried by a regulating arm 22. The regulating arm 22 is fixed to and rotates with a gear segment 23 due to mounting the lower end 24 of the arm on the outer end of a retaining lug 25, Fig. 4, which lug also supports an extension 26 formed on one side radius of the gear segment, the arm 24 frictionally engaging the segment extension and being movable in response to movement of the gear segment. The lug 25 is rotatably mounted in an outstruck apertured protuberance 27 at the lower end of a supporting bracket 28 and is retained in position thereon by an annular flange 29 engaging the rear face of the protuberance 27, the outer end of the lug being flared as at 30, Fig. 4, in such a manner as to maintain the arm 22 and gear segment 23 in keyed engagement and in rotatable relation to the bracket 28. A suitable, preferably lubricated, washer 31 is mounted between the rear face of the segment and the front face of the bracket 28.

The bracket 28 is particularly illustrated in Fig. 5 and is provided at its upper end with spaced apertures 32 for receiving suitable fastening devices 33 to secure the bracket to the front door frame member 9 as shown in Fig. 4. A vertical slot 34 is provided substantially centrally of the bracket in spaced relation to the top edge 35 thereof by striking a tongue 36 therefrom and bending it outwardly and then downwardly, as at 37, to form a flange for supporting the outer end 38 of a worm 39 in an aperture 40 provided in the flange 37. Spaced laterally extending ears 41 and 42 having aligned apertures 43 are also provided on the bracket 28 by striking the same from the bracket below the outwardly extending tongue 36 and bending the ears outwardly.

The worm 39 is bored to receive a shaft 44, the outer end of which is provided with a diametrically extending key 45 engageable in aligned notches 46 in the outer end 38 of the worm 39. The inner end of the shaft 44 extends through the worm and through a centrally bored spur pinion 47. The spur pinion is provided at its outer end with teeth 48 which are engageable with the teeth 49 of the gear segment for rotating the regulating arm 22 to raise or lower the sliding window panel 15, and at its inner end the spur pinion is provided with clutch members 50 for engaging with mating clutch members 51 on a sleeve 52 which is keyed as at 53 to the base portion 54 of a rotatable handle member 55 extending into the interior of the vehicle, the key 53 also extending through the shaft 44 to key the shaft to the handle in such a manner as to effect selective engagement of the outer shaft key 45 in the notches 46 of the worm and the mating clutch members of the spur pinion 47 and handle sleeve, it being apparent that an intermediate position of the shaft 44 effects coincidental engagement of worm 39, spur pinion 47, and handle 55 so that the window panels may be simultaneously or individually moved as will be later more fully described.

The spur pinion 47 is preferably centrally supported by a bushing 56 which is mounted in a casing 57 having its outer ends flanged outwardly as at 58 and being retained on the supporting frame member 9 by overlapping engagement of the plate 28 therewith, as shown in Figs. 4 and 7. The inner end 59 of the casing is reduced to closely engage the spur pinion and the outer end thereof is provided with a lubricated packing member 60 encircling the pinion, the packing being retained about the pinion by an annular cup washer 61 engaged about the pinion and within the casing.

With the construction thus far described, it is apparent that when the handle 55 is pressed inwardly toward the escutcheon 62 on the inner panel 12 of the door structure and thereafter rotated in the usual manner, the mating clutch members of the handle and spur pinion are interengaged and the teeth 48 of the pinion engage the teeth of the gear segment to rotate the segment and arm 22 to raise or lower the sliding window panel 15 depending upon the direction of rotation of the handle.

It has been found that vehicle operators usually adjust the swinging window panel before the sliding panel and I therefore find it desirable to normally maintain the pin 45 on the outer end of the shaft 44 in engagement with the teeth 46 at the outer end of the worm 39 and to this end I provide a coil spring 63 which is mounted about the inner end of the spur pinion and the handle sleeve, one end of the spring bearing against the casing 57 and the other end of the spring bearing against the inner door panel 12 in such a manner that the worm and shaft are maintained in clutched engagement, but the spur pinion and handle sleeve are maintained out of engagement.

A worm gear 64, Fig. 6, is provided having teeth 65 engaging with the teeth of the worm 39 and having a central bore for receiving a shaft 66 extending substantially at right angles to the shaft 44 and one end 67 of which is mounted in the ears 41 and 42 of the bracket 28 and the other end of which is mounted in the apertured ears 68 and 69 of the swinging panel supporting bracket 70, Figs. 8 and 9.

The bracket 70 preferably consists of a plate of generally rectangular shape having the ears 68 and 69 struck outwardly from the central side faces thereof and similar apertured ears 71 and 72 struck outwardly from the central top and bottom side faces thereof, the apertures 73 of the ears being aligned in pairs for extension of the lateral shaft 66 and a vertical shaft 74 in outwardly spaced relation to the shaft 66 on the bracket 70. The bracket 70 is provided with apertures for the extension of fastening devices 75 as shown in Fig. 3 into the supporting frame 9 of the door forwardly relative to the bracket 28. A worm 76 is mounted on the shaft 66 between the ears 68 and 69 which is provided with teeth 77 adapted to mesh with teeth 78 on the worm gear 79 which is suitably fixed to the shaft 74.

The shaft 74 extends vertically and has its end opposite the worm gear end thereof extended through a suitable bearing member 80 mounted on the frame member 8 in alignment with the bracket ears 71 and 72 and is further extended vertically for fixed engagement with a bracket member 81 which supports the bottom edge of the swinging window panel 82 as shown in Fig. 3, it being apparent that rotation of the shaft 66 by the worm 39 rotates the worm gear 79 to rotate the shaft 74 to swing the panel 82 laterally for opening and closing the window depending upon the direction in which the handle is turned.

The operation of an apparatus constructed as described is as follows:

Assuming both window panels 15 and 82 to be in closed position, it frequently happens that the operator of the vehicle is first desirous of regulating the ventilation by adjusting the swinging panel. This is accomplished by merely turning the handle 55 in its free direction until the panel is adjusted to desired position.

When it is desired to regulate the entrance of air through the sliding panel 15, the handle 55 is pressed inwardly against tension of the spring 63 in such a manner that the clutch members on the sleeve 52 and spur pinion 47 are interengaged. Further inward movement of the handle effects disengagement of the shaft key 45 from the notches of the worm 39 and subsequent rotation of the handle in its free direction effects rotation of the gear segment through engagement of the teeth of the segment with the teeth of the spur pinion, rotation of the gear segment causing rotation of the arm 22. Rotation of the arm 22 forces the pin 21 at the outer end thereof downwardly and laterally in the slot of the panel supporting bracket 18 which affects the position of the sliding window panel by forcing it downwardly.

By releasing inward pressure on the handle 55, the spring 63 tends to force the handle toward the interior of the vehicle and in so doing the teeth 45 of the shaft 44 enter into engagement with the notches of the worm 39, the mating clutch members of the spur pinion and handle lug also tending to separate. Before completion of such function and between the extremities of such movement, an intermediate point is reached wherein the shaft is adapted to cause engagement of the handle sleeve with the spur pinion and the worm 39 with the shaft key 45. In this position, the window panels may be adjusted simultaneously in either up or down and lateral directions, respectively.

The principal advantages of an apparatus embodying the present invention are that a single handle lever is available for regulating the ventilation in a motor vehicle, thereby removing the necessity of a multiplicity of protuberances within the vehicle. The single handle lever is adapted by the present invention to selectively adjust the window panels or to adjust the same simultaneously. Further, a quiet and efficient and easily operated apparatus is provided which may be quickly installed and readily manipulated.

What I claim and desire to secure by Letters Patent is:

1. In combination with an automotive vehicle and the door and window structure thereof, an apparatus of the character described including a support on the structure, a drive member on the support, a driven shaft connected with the drive member, actuating means mounted on the support connected with the drive member, and extending within the interior of the vehicle for actuating the drive member and driven shaft, a gear segment connected with the drive member, an arm on the segment, a panel connected with the arm and adapted only for vertical movement in the door structure, a panel connected with the driven shaft and adapted only for lateral swinging movement relative to the window structure, interengageable clutch means on the drive member and on said actuating means adapted for selectively effecting individual and simultaneous movement of said panels, and resilient means mounted on the drive member and engageable with the actuating means normally effecting individual movement of the swinging panel in response to actuation of said actuating means.

2. An apparatus of the character described including in combination with the door structure of an automotive vehicle, a support mounted on said door structure, a drive member mounted on said support having a clutch key at one end, the drive member extending into the interior of the vehicle, a spur pinion on the drive member having teeth at one end and clutch members at the other end, a worm mounted on the outer end of the drive member having notches at one end engageable with the drive member clutch key, an actuating member mounted on the inner end of the drive member having clutch members engageable with the pinion clutch members, a gear segment mounted on the support having teeth engageable with the teeth of the pinion, an arm on the segment, a bracket mounted in the door structure engaged with said arm, a window panel on said bracket slidable vertically in said door structure in response to operation of said actuating member, a driven shaft on the support having a worm gear at one end thereof engageable with the drive member worm, a bracket on the door structure supporting said driven shaft, a worm on the driven shaft, a vertical shaft mounted in the second named bracket having a worm gear thereon engaged with said driven shaft worm, a bracket on the vertical shaft, and a window panel on the vertical shaft bracket swingable laterally in response to actuation of said actuating member.

3. An apparatus of the character described including in combination with the door structure of an automotive vehicle, a support mounted on said door structure, a drive member mounted on said support having a clutch key at one end, the drive member extending into the interior of the vehicle, a spur pinion on the drive member having teeth at one end and clutch members at the other end, a worm mounted on the outer end of the drive member having notches at one end engageable with the drive member clutch key, an actuating member mounted on the inner end of the drive member having clutch members engageable with the pinion clutch members, a gear segment mounted on the support having teeth engageable with the teeth of the pinion, an arm on the segment, a bracket mounted in the door structure engaged with said arm, a window panel on said bracket slidable vertically in said door structure in response to operation of said actuating member, a driven shaft on the support having a worm gear at one end thereof engageable with the drive member worm, a bracket on the door structure supporting said driven shaft, a worm on the driven shaft, a vertical shaft mounted in the second named bracket having a worm gear thereon engaged with said driven shaft worm, a bracket on the vertical shaft, a window panel on the vertical shaft bracket swingable laterally in response to actuation of said actuating member, and means on the actuating member normally tending to maintain the actuating member and pinion clutch members out of engagement for effecting individual operation of the swinging panel.

4. An apparatus of the character described including in combination with the door structure of an automotive vehicle, a support mounted on said door structure, a drive member mounted on said support having a clutch key at one end, the drive member extending into the interior of the vehicle, a spur pinion on the drive member having teeth at one end and clutch members at the other end, a worm mounted on the outer end of the drive member having notches at one end engageable with the drive member clutch key, an actuating member mounted on the inner end of the drive member having clutch members engageable with the pinion clutch members, a gear segment mounted on the support having teeth engageable with the teeth of the pinion, an arm on the segment, a bracket mounted in the door structure engaged with said arm, a window panel on said bracket slidable vertically in said door structure in response to operation of said actuating member, a driven shaft on the support having a worm gear at one end thereof engageable with the drive member worm, a bracket on the door structure supporting said driven shaft, a worm on the driven shaft, a vertical shaft mounted in the second named bracket having a worm gear thereon engaged with said driven shaft worm, a bracket on the vertical shaft, a window panel on the vertical shaft bracket swingable laterally in response to actuation of said actuating member, and means on the actuating member normally tending to maintain the actuating member and pinion clutch members out of engagement for effecting individual operation of the swinging panel, said clutch members, clutch key and worm notches being interengageable in one position for effecting simultaneous movement of said panels.

5. In combination with the door and window structure of a vehicle having a pair of window panels adapted to be respectively pivotally and slidably mounted in said structure, and means for individually and simultaneously pivoting and sliding said panels relative to said structure; means for mounting the sliding panel in said structure including a bracket mounted in said structure having an aperture at one end thereof, a lug rotatably mounted in said aperture, a member fixed to said lug and engaged with said means for sliding said sliding panel for rotating said lug in response to actuation of said means, an arm having one end fixed to said lug, and a bracket on the other end of said arm supporting said sliding panel.

6. In an apparatus of the character described comprising interengaged drive and driven members, a supporting bracket including a plate, a pair of laterally extending ears on said plate adapted for supporting one end of the driven member, a flange on the plate adapted for supporting one end of the drive member adjacent said end of the driven member, said plate having a lug rotatably mounted therein in spaced relation to said ears and flange, a panel supporting member connected to said lug, and means effecting interengagement of said panel supporting member with said drive member.

GEORGE M. CAMPBELL.